(12) United States Patent
Kong et al.

(10) Patent No.: US 6,268,703 B1
(45) Date of Patent: Jul. 31, 2001

(54) GAS DISCHARGE LAMP HAVING A CONTROLLED POWER SOURCE AND A LAMP BASE

(76) Inventors: Xiangong Kong; Suier Zhang, both of Room 403, No. 24, Court 1, Siheng Road, Yuancun, Guangzhou City (CN)

( * ) Notice: Subject to any disclaimer, the term of this patent is extended or adjusted under 35 U.S.C. 154(b) by 0 days.

(21) Appl. No.: 09/482,673

(22) Filed: Jan. 13, 2000

(30) Foreign Application Priority Data

Jan. 15, 1999 (CN) ................................................. 99116011

(51) Int. Cl.[7] ....................................................... G05F 1/00
(52) U.S. Cl. ........................ 315/307; 315/312; 315/294; 315/362
(58) Field of Search ............................... 315/209 R, 291, 315/307, 247, 205, 276, 294, 312, 112, 118, 362

(56) References Cited

U.S. PATENT DOCUMENTS 5,491,388 * 2/1996 Nobuyuki et al. .................... 315/308
5,677,601 * 10/1997 Zuchtriegel ...................... 315/209 R
5,838,116 * 11/1998 Katyl et al. ........................... 315/307

* cited by examiner

Primary Examiner—Haissa Philogene
(74) Attorney, Agent, or Firm—Westman, Champlin & Kelly, P.A.

(57) ABSTRACT

A gas discharge lamp having a controlled power source and a lamp base, the controlled power source comprising a rectifier circuit, a filter circuit, a switching circuit, and a sampling control circuit, and an output circuits. A power source is formed with the rectifier circuit, the filter circuit, the switching circuit, and the sampling control circuit. The output circuits are connected to a plurality of lamps connected serially to form a lamp base. The power source for controlling the lamp has a larger power, and is easier to be regulated. The lamp base can be made more compact and simple. Since only conventional electric wire is used for transmitting the power between the power source and the lamp base, there is not any high requirement on a transmission line. Thus, the application range of the gas discharge lamp is extended, and the environmental requirements on discharge lamps are lowered.

6 Claims, 7 Drawing Sheets

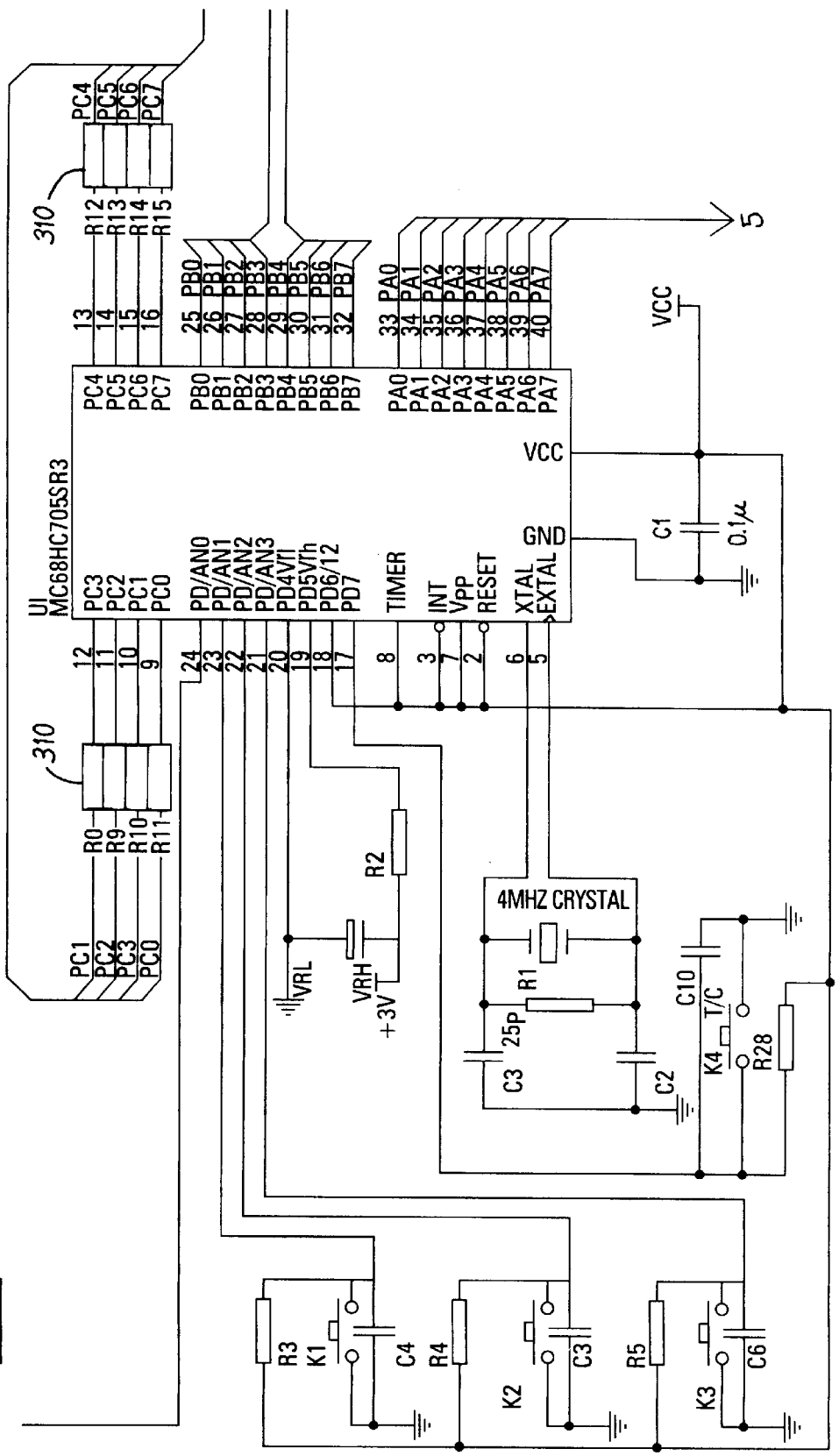

GAS DISCHARGE LAMP HAVING A CONTROLLED POWER SOURCE AND A LAMP BASE

TECHNICAL FIELD

The present invention relates a gas discharge lamp, more particularly, relates to the improvement of its structure.

BACKGROUND

At present, it is a common view that using a gas discharge lamp can save energy in a large area raise the luminous efficiency. Generally, the gas discharge lamps mean the fluorescent lamps, the high-pressure sodium lamps, the mercury lamps, the neon lamps, the metal halite lamps and the xenon lamps etc. For the convenience in the application of the gas discharge lamps, those skilled in the art strive to make the special power sources of the gas discharge lamps more precise and smaller in the size, so that it can be entered the lamp bases or the tube holders directly. Thereby, it is convenient for the application. There are some problems followed, however, in the conventional technology. For example, it is difficult to be reduced in their volume since the gas discharge lamp having a plurality of special power devices, the cost of the lamp base or the lamp holder is higher than the lamp. When a plurality of the gas discharge lamps are used in the same power supply line in a building, it is possible that it generates the third harmonics in the power sources of the lamps. As a result, a number of lamps will respond to the third harmonics, thereby causing a clear reaction in a large area so that the lamps instantaneous damage at the same time.

SUMMARY OF THE INVENTION

An object of the invention is to provide a gas discharge lamp having a plurality of discharge lamp bases (i.e., lamp holders), which can be driven by a single power source. So long as the single power source being controlled and adjusted, the luminous efficiency of the lamps can be improved and the energy cost can be saved in a large area. Thus, there is not required to install a special power source on each discharge lamp base (tube holder). While the luminous efficiency of the discharge lamp is improved at a large scale, the lamp production cost is remarkably reduced, and the life of the discharge lamp is also improved.

The present invention is implemented so that a gas discharge lamp having a controlled power source and a lamp base (i.e., tube holder), a rectifier circuit 4, a switching circuit 5 and a sampling control circuit 6 of the controlled power source form an power source 1, and an output circuit 7 of the controlled source is connected to more than one serially connected lamps to form the lamp base 2.

The above objectives and advantages of the present invention will become more apparent by describing in detail a preferred embodiment thereof with reference to the attached drawings in which:

DETAILED DESCRIPTION OF THE INVENTION

Figure 1:
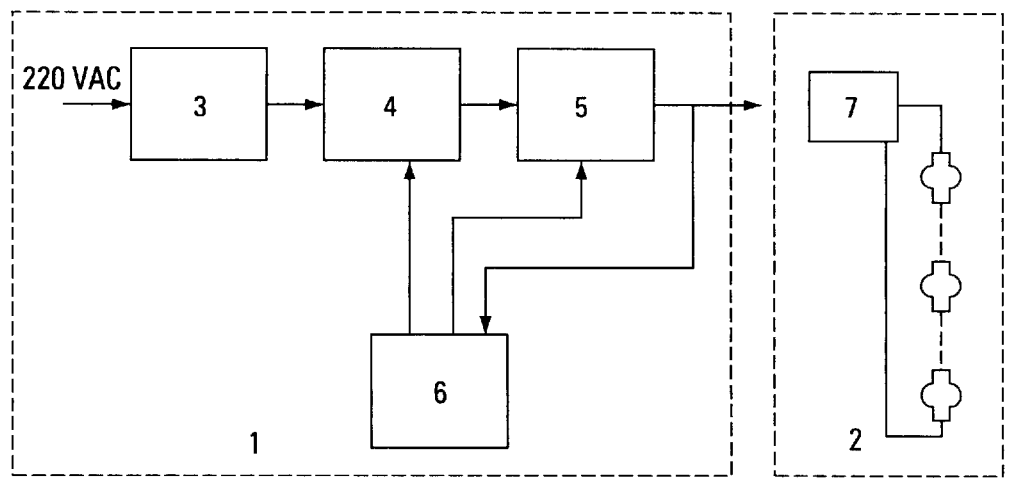
FIG. 1 is a block diagram of a gas discharge lamp according to an embodiment of the present invention.

The gas discharge lamp of the embodiment includes a controlled power source and a lamp base (i. e. a lamp holder), as shown in FIG. 1. A rectifier circuit 4, a switching circuit 5 and a sampling control circuit 6 of the controlled power source form an independent power source 1, and an output circuit 7 of the controlled power source is connected to a plurality of lamps connected serially to form the lamp base 2.

With the above arrangement, the power source 1 can be regulated easily, to meet the voltage, current needed by lamp base 2. To effectively observe and control the instant operation state of the lamp base 2, the sampling control circuit 6 can use a computer as the control processor in the embodiment.

Figure 2:
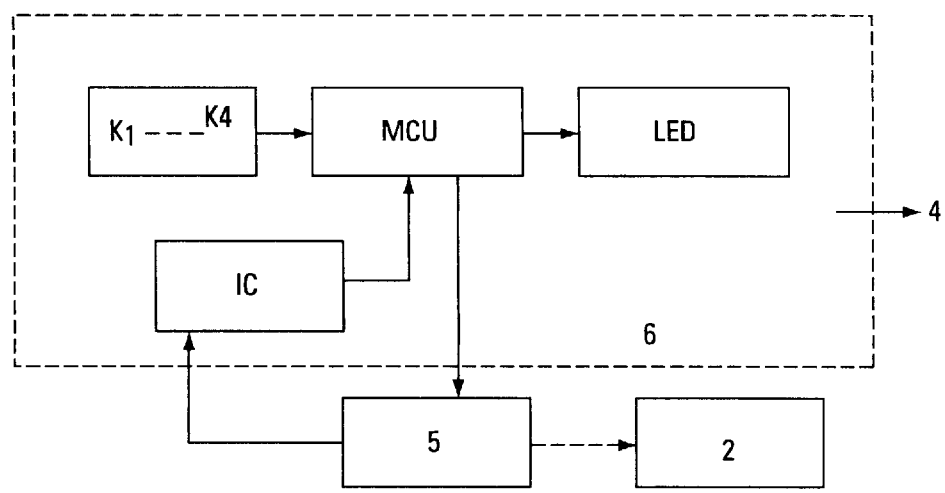
FIG. 2 shows a block diagram of a gas discharge lamp using a microprocessor as a sampling control circuit 6 according to the embodiment of the present invention.

When the power of the gas discharge lamp is lower than 1000 kW, its sampling control circuit can be formed by a microprocessor unit MCU, an I/O interface IC and a digital display LED, as shown in FIG. 2, the I/O interface IC is connected to an I/O input port of a microprocessor unit MCU, and the I/O output ports of the microprocessor unit MCU are connected to the input ports of the digital display LED and the switching circuit 5 respectively. Additionally, four sets of mode selection switching circuit formed by the switches K1–K4 are provided at the input ports of the microprocessor unit MCU for monitoring or adjusting the variables of the temperature and the current etc., respectively. The four sets of mode selection switching circuit further are used for controlling the turned on/off of the gas discharge lamp and the maintenance problems of a branch lamp base 2.

Figures 1, 3:
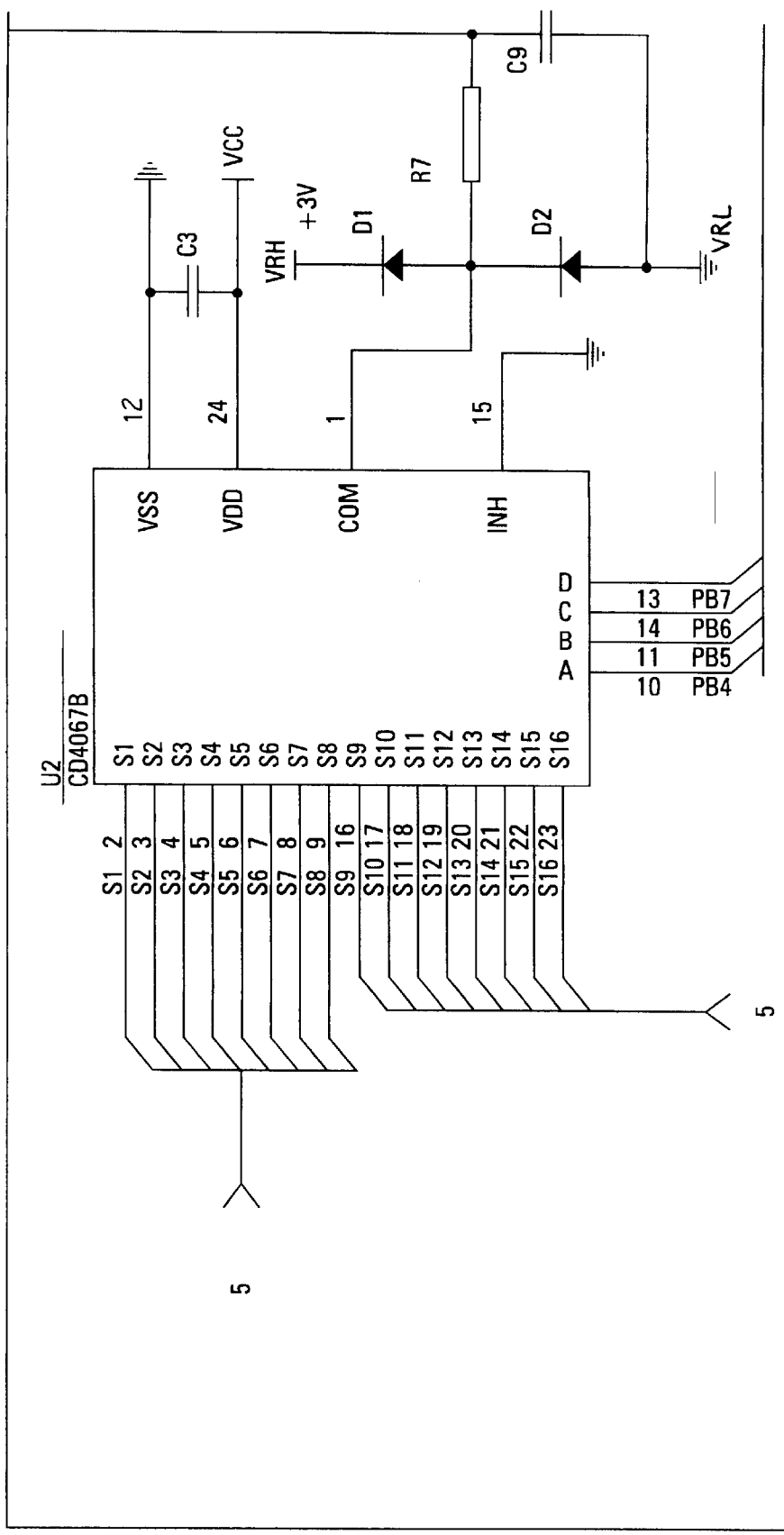
FIG. 3 shows a circuit diagram using a C51 series microprocessor as MCU according to the embodiment of the present invention.
Figure 3:
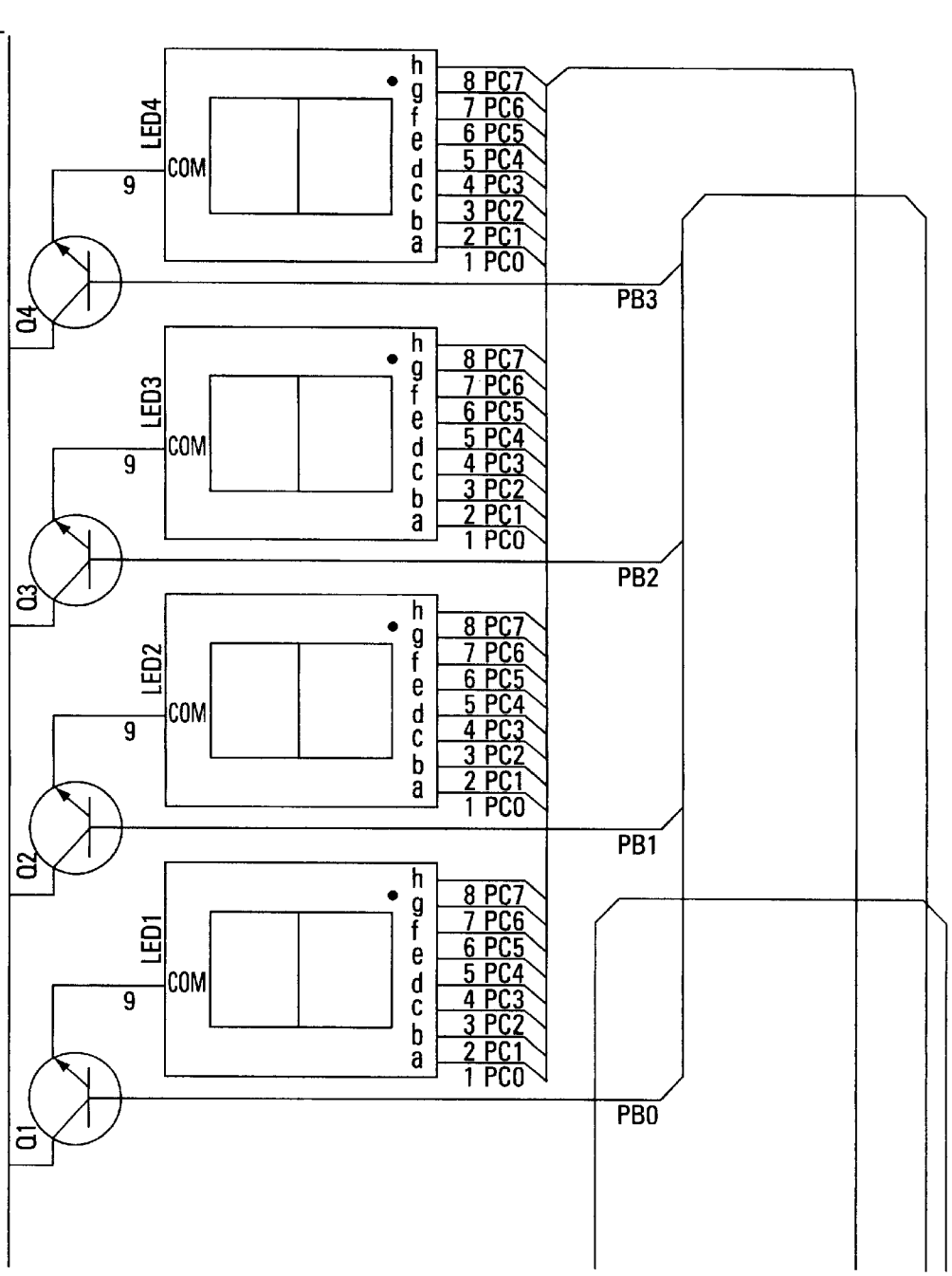

An embodiment of the sampling control circuit 6 would be described in detail, in which a C51 series general purpose microcomputer chip as the MCU and an I/O interface IC in the series of 2 multiple-one out of eight are used. But it is not limited to the present invention; all of the general-purpose eight-channel microprocessor can be used in the present invention. In the embodiment, the sampling control circuit 6 of the power source 1 includes a 6805 microcomputer chip used as the MCU, a two multiple-one out of eight IC (CD 4067B) used as the I/O interface IC, and the charactrons LED1–LED4 used as the digital display device as shown in FIG. 3. As shown in the FIG. 3, eight channels of the temperature and current sampling signals transmitted from the switching circuit 5 are transmitted into the 2–9 and 17–23 pins of the CD 4067B. The ports (A, B, C, D) of the I/O interface IC wires are connected to 29–32 pins of MCU. A crystal oscillator is connected to 5, 6 pins of MCU. The four sets of mode selection switching circuit formed by K1–K4 are connected to 17–23 pins of the MCU in sequence. The temperature and current signals are transmitted from 9–12 pins, 25–28 pins of the MCU to the charactrons LED1–LED4. Additionally, the control-adjusting signal is transmitted from 33–40 pins of the MCU to the input ports of the switching circuit 5.

Figure 4:
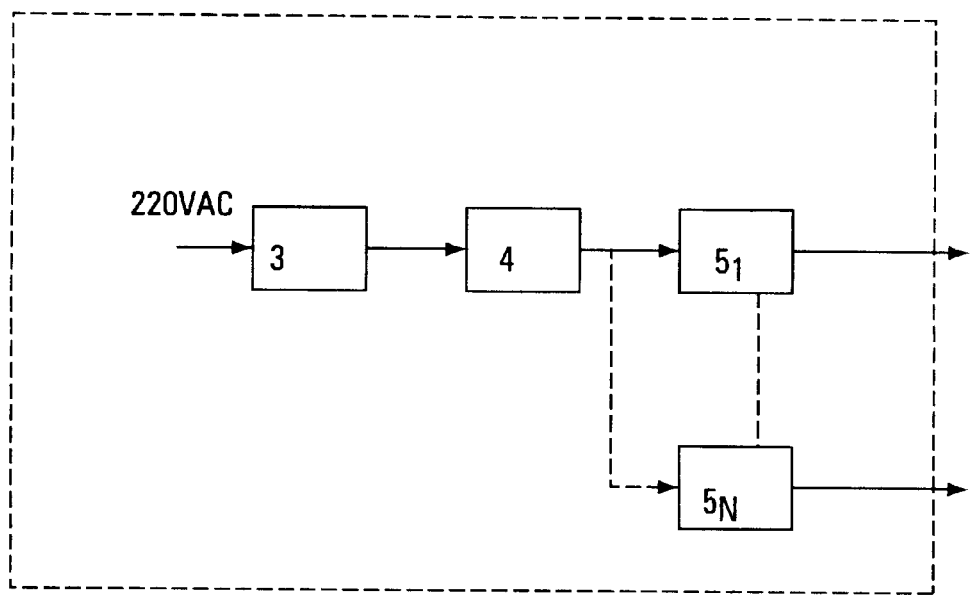
FIG. 4 shows a block diagram of a multichannel integrated power source.

In the present invention, the sampling control circuit 6 can be formed by a microcomputer or a large-scale computer. In the practical application, a plurality switching circuits 5 in source 1 can be parallel connected to an output part of the filter circuit 4 to form the power source 1 having a multi-channel integrated output, as shown in FIG. 4.

Figure 5:
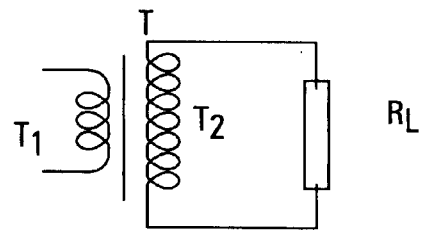
FIG. 5 is a view showing the structure of the gas discharge lamp base 2 according to the embodiment of the present invention.

The discharge lamps according to the present invention comprise the neon lamps, the fluorescent lamps, the high-pressure sodium lamps, the mercury lamps and the xenon lamps etc. The various gas discharge lamps have a different voltage, current and start up voltage in according with the desire for them. In the discharge lamp according to the present invention, the structures of lamp base (lamp holder) 2 are shown as FIG. 5. The output circuit 7 on the lamp base 2 can be formed by a high frequency transformer T and a lamp base load RL. A primary T1 of the high frequency transformer T is connected to an output port of the switching circuit 5 of the power source 1, and a secondary T2 of high frequency transformer T is connected the load RL formed by a plurality of loads RL1–RLn.

Figure 6:
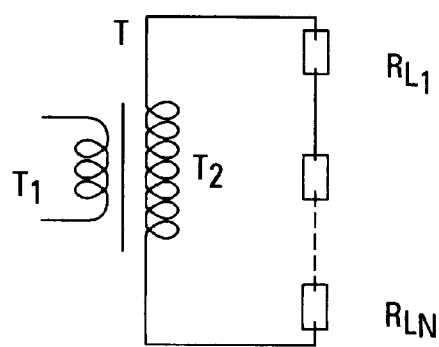
FIG. 6 is a circuit schematic diagram showing a plurality of lamps serially connected to the secondary T2 of a high frequency transformer according to the embodiment of the present invention.
Figure 7:
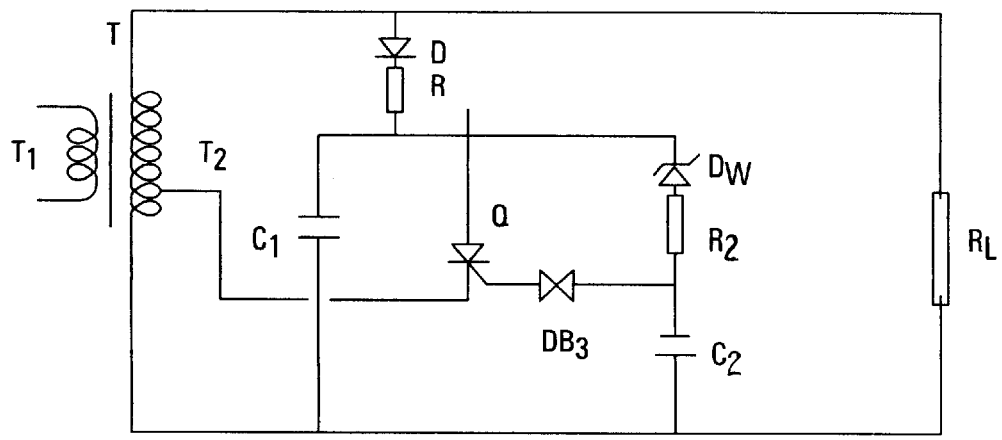
FIG. 7 is a schematic diagram of lamp bases of a high-pressure sodium lamp, mercury lamp with boosted circuits according to an embodiment of the present invention.

Since the high frequency transformer T is adopted, a plurality of the lamp base load RL1–RLn can be serially connected to the secondary T2 based on the requirement, as shown in FIG. 6.

Figure 8:
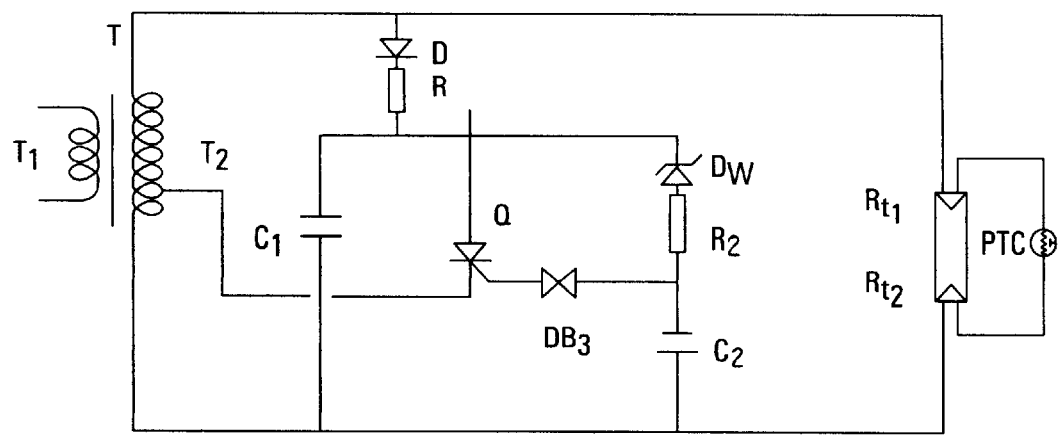
FIG. 8 is a schematic diagram of a fluorescent lamp used for a lamp base according to an embodiment of the present invention.
Figure 9:
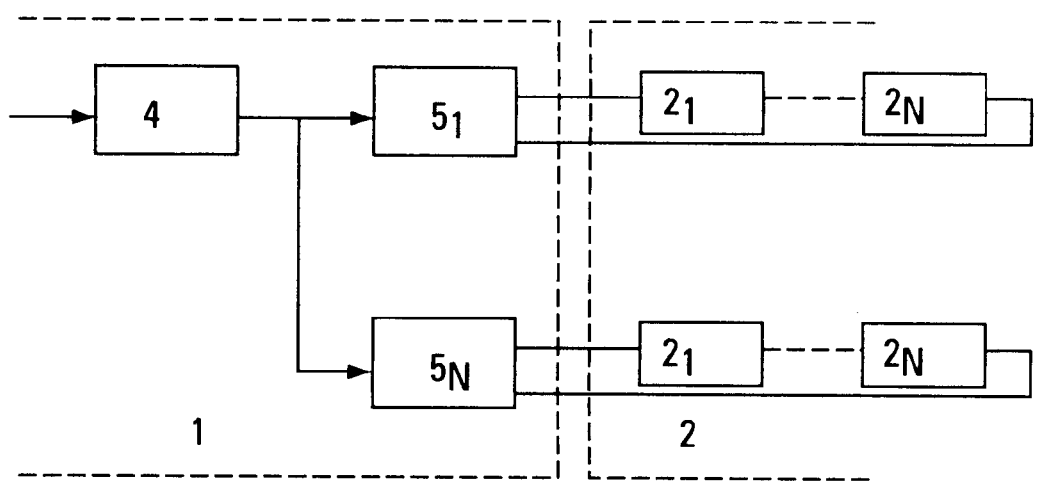
FIG. 9 is a schematic diagram of the multiplex integrated group of the gas discharge lamp according to an embodiment of the present invention.

As described above, since the structures of the lamp base 2 are different based on the types of the structure and gas discharge lamp, their operation voltage and current are also different for each other. Therefore, the different auxiliary means can applied for various lamp bases 2 of discharge lamps, e.g., the lamp bases 2 of the neon lamp and the metal halide lamp can adopt the structure in FIG. 5. When a high/low pressure sodium lamp and a mercury lamp were used, a boosted circuit comprising of a thyristor Q, a bi-directional switching diode DB3, a rectifier diode D, a voltage regulation diode DW, resistors R1 and R2, and capacitors C1 and C2 should be connected to the secondary T2 of the high frequency transformer T. Thus, after a high pressure sodium lamp or a mercury lamp is ignited by the high voltage pulses transmitted from the secondary T2 of the high frequency transformer, a voltage on both ends of the lamp base drops down so that no a high voltage formed thereon. Thus, the application safety of the high-pressure sodium lamp or the mercury lamp is ensured. When the connected lamp base 2 is a fluorescent lamp, in addition of connecting above boosted circuit to the filaments $R_{r1}$ and $R_{r2}$ of the fluorescent lamp, a PTC should be connected both of $R_{r1}$ and $R_{r2}$ to form a filament heating delayed start-up circuit, as shown in FIG. 8.

As the above structure of the lamp base 2, the various lamp bases can be used in the same power source 1. Thus, a multichannel-integrated of the output ports of various switching circuits 5 of the output source 1 can be achieved, as shown in FIG. 4. A plurality of sets of the lamp base string 2–2n can be connected with the switching circuits 5–5n respectively; thereby a large group of the discharge lamps can be formed.

In the gas discharge lamp according to the invention, a plurality of discharge lamp bases 2 are controlled by a single large power source 1 centrally. There is only the high frequency transformer T is remained in each lamp base 2. Therefore, the lamp base (lamp holder) according to the present invention has a smaller volume and is easier to be sealed. Only a conventional electric wires are employed for transmitting power between the various lamp bases 2, which can be located far away from large source 1. Therefore, the lamp bases 2 can be placed on anywhere such as various floors of a commercial building, a conference hall, an open-air meeting room and a public bus line. Additionally, the discharge lamp can be adjusted more simply and effectively in a large area.

With the structure of the discharge lamp according the invention, the power source for controlling the lamp has a larger power, and is easier to be regulated compared with that of the prior art. The lamp base can be made more compact and simple. Additionally, since only conventional electric wire is used for transmitting the power between the power source 1 and the lamp base 2, there is not any high requirement on a transmission line. Thus, the application range of the gas discharge lamp is extended, and the environmental requirements on discharge lamps are lowered.

What is claimed is:

1. A gas discharge lamp having a controlled power source and a lamp base, said controlled power source comprising a rectifier circuit, a filter circuit, a switching circuit, and a sampling control circuit, and an output circuit, wherein a power source is formed with the rectifier circuit, the filter circuit, the switching circuit, and the sampling control circuit; the output circuit is connected to more than one lamps connected serially to form a lamp base;

said sampling control circuit comprising a microprocessor unit MCU, an I/O interface IC, and a digital display device LED; and said I/O extended interface IC is connected to the I/O input port of said microprocessor unit MCU, the I/O output ports of said microprocessor unit MCU are connected to the input ports of said switching circuit and said digital display LED respectively, and four sets of the mode selection switching circuit formed by switches K1–K4 are disposed at the input ports of the microprocessor unit MCU.

2. A gas discharge lamp according to claim 1, wherein said sampling control circuit employs general purpose eight bit microcomputer chips in C51 series for the MCU, two multiplex—one out of eight CD 4067 B for I/O extended interface IC, LED1–LED4 for digital display, wherein eight channels of the temperature and current sampling signals transmitted from the switching circuit are applied at the 2–9 and 17–23 pins of the I/O interface IC, the A, B, C, D ports of the I/O interface IC are connected to 29–32 pins of said microprocessor MCU, a crystal oscillator is connected to 5, 6 pins of said microprocessor MCU, four sets of mode selection switching circuit formed by K1–K4 are connected to 17–23 pins of said microprocessor MCU in this order, the temperature and current signals are transmitted from 9–12 pins, 25–28 pins of said microprocessor MCU to the charactrons display LED, a control adjusting signal is transmitted from 33–40 pins of said microprocessor MCU to the input ports of said switching circuit.

3. A gas discharge lamp according to claim 1, wherein a plurality of switching circuits are parallel connected to an output port of said filter circuit to form a multichannel integrated output power source.

4. A gas discharge lamp according to claim 3, wherein more than one set of lamp base string (2–2n) can be connected to output ports of various switching circuits (5–5n) of multichannel integrated output power source.

5. A gas discharge lamp having a controlled power source and a lamp base, said controlled power source comprising a rectifier circuit, a filter circuit, a switching circuit, and a sampling control circuit, and output circuits;

wherein a power source is formed with the rectifier circuit, the filter circuit, the switching circuit, and the sampling control circuit;

an output circuit is connected to more than one lamps connected serially to form a lamp base;

wherein said output circuit on said lamp base comprises of a high frequency transformer T and a lamp base load RL; and wherein the primary (T1) of the high frequency transformer (T) is connected to an output port of said switching circuit of said source, and the secondary (T2) of the high frequency transformer T is connected to more than one lamp base load RL1 . . . RLn, wherein a boosted circuit comprising a thyristor Q, a bi-directional switching diode DB3, a rectifier diode D, a voltage-regulator diode DW, resistors R1 and R2, and capacitors C1 and C2 is connected to the secondary (T2) of the high frequency transformer T.

6. A gas discharge lamp according to claim 5, wherein when fluorescent lamp filaments Rt1, Rt2 are connected to said boosted circuit, a PTC is connected between the filaments Rt1 and Rt2 provided on both ends of a fluorescent lamp to form a filament heating delayed start-up circuit.

* * * * *